No. 866,186. PATENTED SEPT. 17, 1907.
A. P. BRUSH.
VARIABLE SPEED FRICTION MECHANISM.
APPLICATION FILED OCT. 20, 1906.
2 SHEETS—SHEET 1.
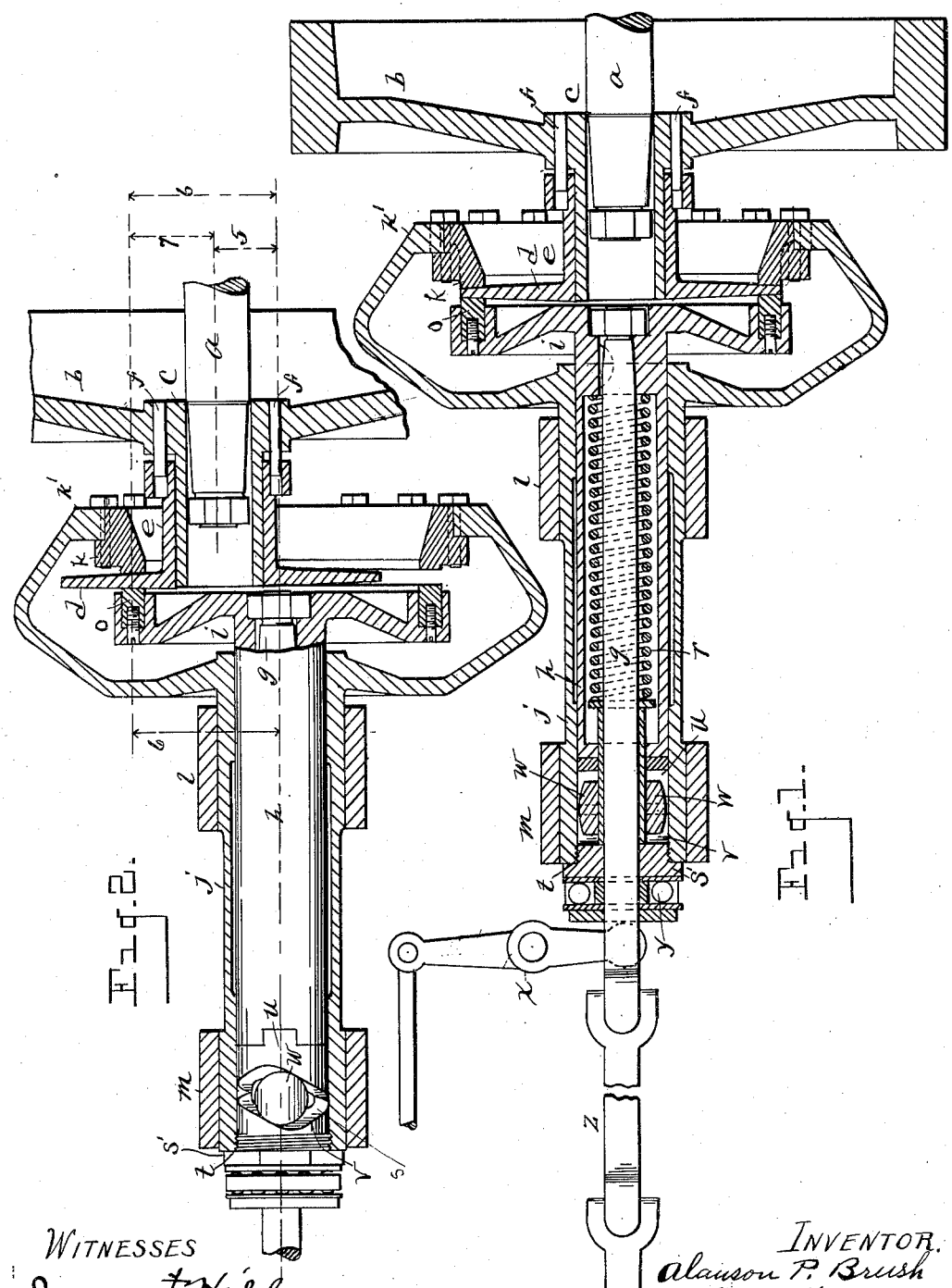
WITNESSES
INVENTOR.
Alanson P. Brush
By his attorney
Newell S. Wright.

No. 866,186. PATENTED SEPT. 17, 1907.
A. P. BRUSH.
VARIABLE SPEED FRICTION MECHANISM.
APPLICATION FILED OCT. 20, 1906.
2 SHEETS—SHEET 2.
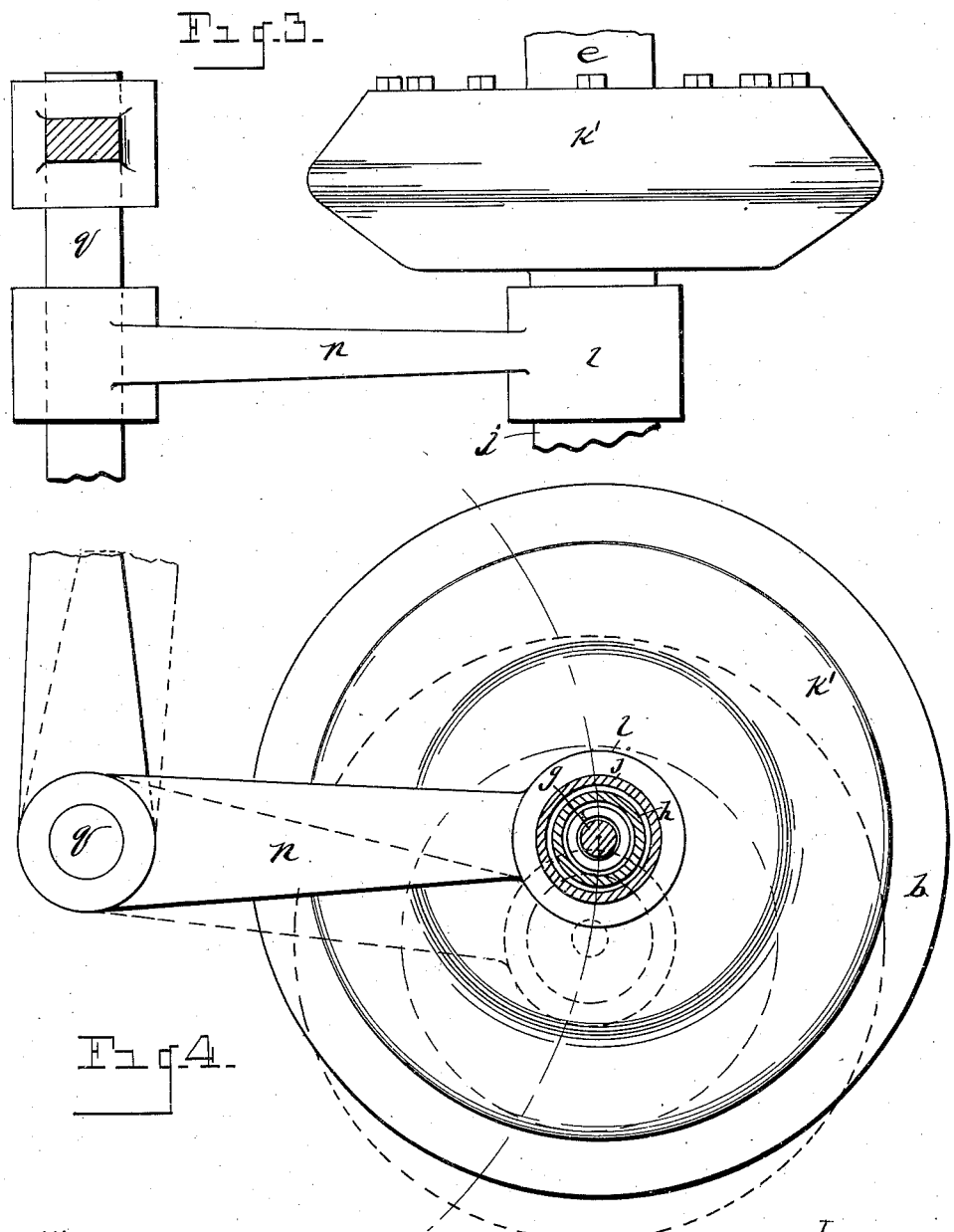
WITNESSES.
O. B. Baenziger
C. M. Spielburg
INVENTOR.
Alanson P. Brush
By his Attorney
Newell S. Wright.

UNITED STATES PATENT OFFICE.

ALANSON P. BRUSH, OF DETROIT, MICHIGAN.

VARIABLE-SPEED FRICTION MECHANISM.

No. 866,186.            Specification of Letters Patent.            Patented Sept. 17, 1907.

Application filed October 20, 1906. Serial No. 339,883.

*To all whom it may concern:*

Be it known that I, ALANSON P. BRUSH, a citizen of the United States, residing at Detroit, county of Wayne, State of Michigan, have invented a certain new and useful Improvement in a Variable-Speed Friction Mechanism, of which the following is a specification, reference being had to the accompanying drawings, which form a part of this specification.

My invention is designed to provide a variable speed friction mechanism of superior construction and utility, and it consists of the construction, combination and arrangement of devices hereinafter described and claimed and illustrated in the accompanying drawings, in which, Figure 1 is a view in longitudinal section showing the driving and driven shafts in alinement with the friction mechanism in corresponding position. Fig. 2 is also a view in longitudinal section showing the driving and driven shafts out of alinement and the friction mechanism in corresponding position. Fig. 3 is a view in plan illustrating portions of the mechanism. Fig. 4 is a view in vertical section.

The aim of my invention is to provide a variable speed friction mechanism adapted for any purpose where a frictional speed varying device is desired.

In carrying out my invention $a$ represents a driving shaft, the same being shown provided herewith with a fly wheel indicated at $b$, upon the hub $c$ of which is mounted a friction disk $d$, the disk being shown thicker toward its center or hub $e$ than at its periphery, its hub being mounted upon the hub $c$ of the fly wheel, preferably in a manner permiting a desired movement of the disk longitudinally of the shaft, as by pins $f$.

A driven shaft is indicated at $g$ upon which is shown rigidly engaged a sleeve $h$, said sleeve provided with a disk $i$ which carries a friction ring $o$ engageable upon the inner surface of the friction disk $d$. Journaled upon the sleeve $h$ and upon the driven shaft, is an additional sleeve $j$, the journaled sleeve $j$ being provided with a support $k'$ carrying a ring indicated at $k$ engageable with the outer surface of the friction disk $d$.

Bearings for the journaled sleeve $j$ are shown at $l$ and $m$, said bearings being preferably arranged to be adjusted in any desired manner so as to carry the driven shaft and the rings $o$ and $k$ toward or away from the axial line of the driving shaft. I do not limit myself to any specific mechanism for adjusting the bearings of the driven shaft, but I have shown herewith, for purposes of illustration, a bell crank lever $n$ fulcrumed upon a counter shaft $q$.

Within the sleeve $h$ and exerting its tension thereupon, to hold the rings $o$ and $k$ in engagement with the friction disk $d$, is a coiled spring $r$.

The sleeve $j$ is journaled at one extremity upon the driven shaft by means of a bearing $s'$ formed with a cam $s$, which may have a threaded engagement with the sleeve $j$ as indicated at $t$.

The sleeve $h$ at the end thereof, opposite the ring $o$ is provided with a cam indicated at $u$, the cams $u$ and $s$ having correspondingly angled cam surfaces between which in a chamber $v$, are located rolls $w$.

To permit the driven shaft being moved out of alinement with the axis of the driving shaft, the driven shaft is provided with any suitable means as with a universal coupling indicated at $z$.

It will be apparent by reference to Fig. 1, that when the driving and the driven shafts are in alinement, the friction rings $o$ and $k$ will engage the friction disk $d$ on opposite surfaces thereof toward the periphery of the friction disk. It will be obvious also, by reference to Fig. 2, that when the driven shaft is moved out of alinement with the axis of the driving shaft, the friction rings $o$ and $k$ will engage the friction disk at any desired points between the periphery of the friction disk and its hub. In Fig. 2, for example, the driven shaft is moved out of alinement with the axis of the driving shaft a radial distance indicated by the dotted line shown at the numeral 5, while at the same time the friction rings $o$ and $k$ will be moved inward toward the hub of the friction disk a corresponding distance, thereby decreasing the speed of the driven shaft to a ratio approximating the ratio of the radii indicated by the numerals 6 and 7. The friction disk is herewith shown tapering from its hub toward its periphery, and it will be obvious because of the taper of the friction disk, that while the shafts are in exact alinement the rings $o$ and $k$ contact with the friction disk $d$, throughout their entire surfaces. When the shafts are out of alinement the friction rings will each contact with the friction disk in one line only, thus obviating any slipping between the rings $o$ and $k$ and the friction disk, except that due to differences of radii of the different points in the contact line. If the ring $o$ should slip on the friction disk $d$, the ring $k$ will be carried about with the friction disk until the cam $s$ brings up against the rolls interposed between the angular cam surfaces of the cams $u$ and $s$. In other words the surface of the cam $s$ forces the rolls against the corresponding cam surface of the cam $u$, the rolls between these two correspondingly angled cam surfaces forming practically a roller thread, the rolls being introduced to prevent the friction that would arise consequent upon the use of an ordinary thread. If there is any slipping, as above referred to, the rollers between the cam surfaces work automatically and build up the frictional tension of the rings $o$ and $k$ upon the friction disk $d$ in proportion to the load.

It will be evident that the range of contact of the rings $o$ and $k$ upon the friction disk $d$, or in other words, the speed, can be shifted or changed while the mechanism is running. It will be obvious that, since the two rings $o$ and $k$ revolve at the same rate and about a common center, there are no running bearings which carry the frictional tension, the entire frictional tension being carried by the spring r and the rolls between the cams s and u, there being no change in position of the cams and rolls, or any motion of the ring k with respect to the ring o, except sufficient movement when the loads change to correct the frictional tension or when the speeds change to allow for the taper of the disk. While the mechanism as shown provides for a speed of the driven shaft equal to or lower than that of the driving shaft, by reversing the mechanism, or in other words making the driven shaft shown herewith the driving shaft, we would have a mechanism providing for speeds of the driven shaft equal to or higher than the driving shaft. It will also be obvious that it is immaterial which shaft shall be moved out of line with the other, as it is only essential that the alinement of the shafts be shifted, the one relative to the other, in order to get a change of speed ratio. It is also evident that this mechanism with the cam surfaces, as shown on the cams s and u, will operate to automatically proportion the friction tension to the load transmitted irrespective of the direction of rotation. A lever shown at x acts through the bearing s' and up on the casing j forcing the casing longitudinally along the driven shaft, thus forcing the friction rings o and k apart, thereby releasing the friction disk d allowing the shafts to revolve independently the one of the other.

Since the two friction rings are on opposite sides of the disk, and since as illustrated and hereinbefore described, they revolve together as one body, no revolving bearing carries the load of the tension between the friction surfaces, the frictional tension between one ring and one side of the disk being balanced by the corresponding frictional tension between the other ring and the other side of the disk, the invention thus furnishing means to balance the frictional tension on opposite sides of the disk.

What I claim as my invention is:

1. A friction speed mechanism to obtain varying speed ratios comprising a friction disk made thicker toward its center than at its periphery, friction rings contacting upon opposite sides of the friction disk, and means to bring the centers of rotation of the friction rings and the friction disk into and out of alinement.

2. A friction speed mechanism to obtain varying speed ratios comprising a friction disk made thicker toward its center than at its periphery, friction rings contacting upon opposite sides of the friction disk having a common center of rotation, and means to bring the centers of rotation of the friction rings and the friction disk into and out of alinement.

3. A friction speed mechanism to obtain varying speed ratios comprising a friction disk made thicker toward its center than at its periphery, friction rings contacting upon opposite sides of the friction disk, means to vary the distance between the centers of rotation of the friction rings and the friction disk, and mechanism to separate the friction rings at the will of the operator, thereby releasing their hold upon the friction disk.

4. A friction speed mechanism to obtain varying speed ratios comprising a driving and a driven shaft located end to end when in alinement, a friction disk carried by one of said shafts, friction rings carried by the other of said shafts contacting on opposite sides of the friction disk, and means to vary the relation of the axes of the driving and of the driven shafts.

5. A friction speed device comprising bearings, plural frictional bodies, means to frictionally contact with said bodies, and means to balance the frictional tensions thereby relieving the bearings from the load due to the frictional tension.

6. A friction speed device comprising a rotatable driving and a rotatable driven member, and means to bring the centers of rotation of said members into and out of alinement to provide variations of speed in the driven member from a speed equal to that of the driving member continuously within its range to a speed lower than that of the driving member.

7. A friction speed device comprising a driving and a driven member, means to provide variations of speed in the driven member from a speed equal to that of the driving member continuously within its range to a speed lower than that of the driving member, and means to secure no motion with respect to each other between the frictional surfaces when the speeds of the driving and the driven members are equal.

8. A friction speed device comprising a rotatable driving and a rotatable driven member, and means to bring the centers of rotation of said members into and out of alinement to provide variations of speed in the driven member from a speed equal to that of the driving member continuously within its range to a speed higher than that of the driving member.

9. A friction speed device comprising a driving and a driven member, means to provide variations of speed in the driven member from a speed equal to that of the driving member continuously within its range to a speed higher than that of the driving member, and means to secure no motion with respect to each other between the frictional surfaces when the speeds of the driving and the driven members are equal.

10. A friction mechanism comprising a driving shaft, a friction disk carried upon the driving shaft, a driven shaft, a ring to contact with one surface of said disk having a hub rigidly mounted upon the driven shaft, a sleeve journaled upon said hub and upon the driven shaft provided with an additional ring to contact with the opposite surface of said disk, and automatic mechanism to vary the frictional tension of said rings upon said disk as the load varies.

11. A friction mechanism comprising a driving shaft, a friction disk carried upon the driving shaft, a driven shaft, a ring to contact with one surface of said disk having its hub rigidly mounted upon the driven shaft, a spring to exert its tension upon said ring to hold the ring in frictional contact with said disk, a sleeve journaled upon said hub and upon the driven shaft provided with an additional ring to contact with the opposite surface of said disk, and automatic mechanism to increase the frictional tension as the load varies.

12. A friction mechanism embodying a driving shaft, a friction disk carried upon the driving shaft, a driven shaft, a ring to contact with one surface of said disk having its hub rigidly mounted upon the driven shaft, a spring to hold said ring in frictional contact with said disk, a sleeve journaled upon said hub and upon the driven shaft provided with an additional ring to contact with the opposite surface of said disk, means to release the frictional contact of said rings upon said disk, and automatic mechanism to force said rings into frictional engagement with said disk.

13. A friction mechanism comprising a driving shaft, a friction disk carried upon the driving shaft, a driven shaft, a ring to contact with one surface of said disk having its hub rigidly mounted upon the driven shaft, a sleeve journaled upon said hub and upon the driven shaft, provided with an additional ring to contact with the opposite surface of said disk, said hub and said sleeve provided with oppositely disposed cams, and rollers located between said cams for the purpose described.

14. A friction speed mechanism comprising a driving and a driven shaft located end to end when in alinement, a friction disk carried upon the driving shaft, rings to contact with said disk on opposite sides thereof, and automatic mechanism to force said rings into frictional contact with said disks.

15. A friction speed mechanism comprising a driving shaft, a friction disk carried upon the driving shaft made thicker at its center than toward its periphery, rings to contact with said disk on opposite sides thereof, automatic mechanism to force said rings into frictional contact with said disk, and means to release said rings from frictional contact with said disks.

16. A friction mechanism comprising a driving shaft, a friction disk carried thereupon and made thicker at its center than toward the periphery thereof, a driven shaft, and rings carried upon the driven shaft to contact with opposite surfaces of the friction disk, one of said shafts movable into and out of alinement with the axis of the other shaft.

17. A friction speed device comprising a driving and a driven shaft, a frictional body carried by the driving shaft, frictional bodies carried by the driven shaft, said bodies being stationary with respect to each other when the driving and driven shafts revolve with equal speeds.

In testimony whereof, I have signed this specification in the presence of two subscribing witnesses.

ALANSON P. BRUSH.

Witnesses:
 WM. EMERY BRUSH,
 N. S. WRIGHT.